(12) United States Patent
Geissler (10) Patent No.: US 7,235,759 B2
(45) Date of Patent: *Jun. 26, 2007

(54) METHOD AND APPARATUS FOR RECEIVING A UNIVERSAL INPUT VOLTAGE IN A WELDING, PLASMA OR HEATING POWER SOURCE

(75) Inventor: Steven J. Geissler, Little Chute, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/331,464

(22) Filed: Jan. 13, 2006

(65) Prior Publication Data

US 2006/0138112 A1    Jun. 29, 2006

Related U.S. Application Data

(63) Continuation of application No. 10/826,534, filed on Apr. 16, 2004, now Pat. No. 6,987,242, which is a continuation of application No. 10/624,851, filed on Jul. 21, 2003, now Pat. No. 6,815,639, which is a continuation of application No. 09/969,535, filed on Oct. 1, 2001, now abandoned, which is a continuation of application No. 09/540,567, filed on Mar. 31, 2000, now Pat. No. 6,329,636.

(51) Int. Cl.
    *B23K 9/10*    (2006.01)
(52) U.S. Cl. ..................... 219/130.1; 363/142
(58) Field of Classification Search ............ 219/130.1, 219/130.21, 130.31, 130.32, 130.33, 137 PS; 363/142

See application file for complete search history.

(56) References Cited

U.S. PATENT DOCUMENTS 4,104,724 A    8/1978    Dix et al.

(Continued)

FOREIGN PATENT DOCUMENTS

DE    4219222 A1    1/1993

(Continued)

OTHER PUBLICATIONS

Resonant Transition Switching Welding Power Supply—Institute for Power Electronics and Electrical Drives.

(Continued)

*Primary Examiner*—Clifford C. Shaw
(74) *Attorney, Agent, or Firm*—George R. Corrigan (57) ABSTRACT

A method and apparatus for providing welding type power is disclosed. The power source is capable of receiving any input voltage over a wide range of input voltages and includes an input rectifier that rectifies the ac input into a dc signal. A dc voltage stage converts the dc signal to a desired dc voltage and an inverter inverts the dc signal into a second ac signal. An output transformer receives the second ac signal and provides a third ac signal that has a current magnitude suitable for welding, cutting or induction heating. The welding type current may be rectified and smoothed by an output inductor and an output rectifier. A controller provides control signals to the inverter and a controller power supply can also receive a range of input voltages and provide a control power signal to the controller, and a voltage independent of the input voltage.

45 Claims, 5 Drawing Sheets

U.S. PATENT DOCUMENTS

| | | | |
|---|---|---|---|
| 4,280,041 A | 7/1981 | Kiessling | |
| 4,473,734 A | 9/1984 | Henry | |
| 4,521,672 A | 6/1985 | Fronius | |
| 4,533,986 A | 8/1985 | Jones | |
| 4,564,742 A | 1/1986 | Karlsson | |
| 4,626,980 A | 12/1986 | McGuire | |
| 4,635,181 A | 1/1987 | Bourgeault | |
| 4,639,849 A | 1/1987 | Noworolski et al. | |
| 4,683,529 A | 7/1987 | Bucher, II | |
| 4,849,873 A | 7/1989 | Vanderhelst | |
| 4,985,612 A | 1/1991 | Izume et al. | |
| 5,086,206 A | 2/1992 | Thommes | |
| 5,130,917 A | 7/1992 | Shekhawat | |
| 5,149,935 A | 9/1992 | Ozimek et al. | |
| 5,166,491 A | 11/1992 | Izume et al. | |
| 5,189,277 A | 2/1993 | Boisvert et al. | |
| 5,272,313 A | 12/1993 | Karino et al. | |
| 5,289,046 A | 2/1994 | Gregorich et al. | |
| 5,315,089 A | 5/1994 | Hughes et al. | |
| 5,319,533 A | 6/1994 | Reynolds et al. | |
| 5,406,050 A | 4/1995 | Macomber et al. | |
| 5,444,356 A | 8/1995 | Reynolds et al. | |
| 5,465,011 A | 11/1995 | Miller et al. | |
| 5,520,611 A | 5/1996 | Rao et al. | |
| 5,563,777 A | 10/1996 | Miki et al. | |
| 5,601,741 A | 2/1997 | Thommes | |
| 5,811,757 A | 9/1998 | Higgins | |
| 5,821,491 A | 10/1998 | Dew et al. | |
| 5,824,990 A | 10/1998 | Geissler et al. | |
| 5,837,968 A | 11/1998 | Rohrberg et al. | |
| 5,864,110 A | 1/1999 | Moriguchi et al. | |
| 5,926,381 A | 7/1999 | Moriguchi et al. | |
| 5,991,169 A | 11/1999 | Kooken | |
| 6,002,103 A | 12/1999 | Thommes | |
| 6,023,037 A | 2/2000 | Church et al. | |
| 6,051,806 A | 4/2000 | Shikata et al. | |
| 6,054,674 A | 4/2000 | Moriguchi et al. | |
| 6,067,241 A | 5/2000 | Lu | |
| 6,239,407 B1 | 5/2001 | Thommes | |
| 6,329,636 B1 | 12/2001 | Geissler | |
| 6,365,868 B1 | 4/2002 | Borowy et al. | |
| 6,815,639 B2 | 11/2004 | Geissler | |
| 6,849,827 B2 | 2/2005 | Thommes | |
| 6,987,242 B2 * | 1/2006 | Geissler | 219/130.1 |

FOREIGN PATENT DOCUMENTS

| | | |
|---|---|---|
| DE | 4128175 | 2/1993 |
| DE | 4211906 | 6/1993 |
| DE | 4411227 | 10/1995 |
| EP | 0241249 | 10/1987 |
| EP | 0241250 | 10/1987 |
| EP | 0410088 | 12/1998 |
| EP | 0970775 A5 | 1/2000 |
| GB | 2258958 | 2/1993 |
| GB | 0704 957 | 5/1999 |
| JP | 59220285 | 12/1984 |
| JP | 62107868 | 5/1987 |
| JP | HI-215465 | 8/1989 |
| JP | S63-42690 | 8/1989 |
| JP | S63-190646 | 2/1990 |
| JP | H111-77302 | 3/1999 |

OTHER PUBLICATIONS

IECON '94 20th International Conference on industrial Electronics, Control and instrumentation Voll of 3 Plenary Session Power Electronics.

Miller® *The Power of Blue*, Spectrum 2050, Owners Manual, Nov. 1999.

Unitrode, Application Note, UC3854 Controlled Power Factor Correction Circuit Design, Philip C. Todd.

Single-Stage Single-Phase Parallel Power Factor Correction Scheme. Y. Jiang and F.C. Lee 1994 VPEC. Reprint with permission from *Proceedings of the Power Electronics Specialist Conference*; Taipei, Taiwan; Jun. 20-25, 1994.

Unitrode Corporation, Boost Power Factor Corrector Design With The UC3853, By Philip C. Todd.

Design Issues For A Zero-Switched Power Factor Correction Circuit and DC/DC Converter Power Processing Unit, Y.V. Panov, J.A. Sabate, and F.C. Lee 1993 VPEC Reprinted with permission from *Proceedings of the Virginia Power Electronics Seminar*, Blackburg, VA; Sep. 19-21, 1993; pp. 213-224.

Unitrode Corporation A High Performance Linear Regulator For Low Dropout Applications Dave Zendzian Applications Engineer.

Unitrode Corporation, High Power Factor Switching Preregulator Design Optimization, Llyod Dixon.

Miller® Maxtar 200 STR Owners Manual Oct. 2003.

A Novel Single-Phase Power Factor Correction Scheme Y.M. Jiang, F.C. Lee, G.C. Hua, and W. Tang 1993 VPEC Reprinted with permission from *Proceedings of the Applied Power Electronics Conference*: San Diego, CA; Mar. 7-11, 1993; 287-292.

Unitrode, Application Note, Power Factor Correction Using The UC3852 Controlled On-Time Zero Current Switching Technique, Bill Andreycak.

Reduction of Voltage Stress in Intregated High- Quality Rectifier-Regulators by Variable-Frequency Control, M.M. Jovanovic, D.M. Tsang, and F.C. Lee, 1994 VPEC. Reprinted with permission from *Proceedings of the Applied Power Electronics Conference*; Orlando, FL; Feb. 13-17, 1994; pp. 569-575.

Martinez, Roberto, et al. "A High-Performance Single-Phase rectifier With Input Power Factor Correction," IEEE Transaction on Power Electronics, vol. 11, No. 2, Mar. 1996, pp. 311-317.

Streit, Robert et al. "High Efficiency Telecom Rectifier using a Novel Soft-Switched Boost-Based Input Current Shaper," Intelec '91, published Nov. 1991, pp. 720-726.

Dixon, Jr., Lloyd H. (Dec. 1990) High Power Factor Preregulator for Off-Line Power Supplies, High Power Factor Preregulator, Unitrod Corporation, pp. 1-15.

Smith, Jr., K. Mark et al. "Properties and Synthesis of Passive, Lossless Soft-Switching PWM Converters," 1st International Congress in Israel on Energy & Motion Control, 1997, pp. 1-8.

Nave, Mark J. (1991), "Power Line Filter Design for Switched-Mode Power Supplies," Van Nostrand Reinhold (New Your, NY), pp. 1-28.

Pierre, Edward R. (1774), "Welding Processes and Power Sources," Burgess Publishing Company (Minneapolis, MN), pp. 136-141.

* cited by examiner

METHOD AND APPARATUS FOR RECEIVING A UNIVERSAL INPUT VOLTAGE IN A WELDING, PLASMA OR HEATING POWER SOURCE

RELATED APPLICATIONS

This is a continuation of, and claims the benefit of the filing date of, U.S. patent application Ser. No. 10/826,534, filed on Apr. 16, 2004, entitled Method And Apparatus For Receiving A Universal Input Voltage In A Welding, Plasma Or Heating Power Source, which issued on Jan. 17, 2006 as Pat. No. 6,987,242, and which is a continuation of, and claims the benefit of the filing date of U.S. patent application Ser. No. 10/624,851, filed on Jul. 21, 2003, now U.S. Pat. No. 6,815,639 entitled "Method And Apparatus For Receiving A Universal Input Voltage In A Welding, Plasma Or Heating Power Source," which is a continuation of U.S. patent application Ser. No. 09/969,535, filed Oct. 1, 2001, entitled Method And Apparatus For Receiving A Universal Input Voltage In A Welding, Plasma Or Heating Power Source, now abandoned, which is a continuation of U.S. patent application Ser. No. 09/540,567, filed Mar. 31, 2000, now U.S. Pat. No. 6,329,636, entitled Method And Apparatus For Receiving A Universal Input Voltage In A Welding, Plasma Or Heating Power Source.

FIELD OF THE INVENTION

This invention generally relates to power sources. More particularly, this invention relates to power sources employed in welding, cutting and heating applications.

Power sources typically convert a power input to a necessary or desirable power output tailored for a specific application. In welding applications, power sources typically receive a high voltage alternating current (VAC) signal and provide a high current output welding signal. Around the world, utility power supplies (sinusoidal line voltages) may be 200/208V, 230/240V, 380/415V, 460/480V, 500V and 575V. These supplies may be either single-phase or three-phase and either 50 or 60 Hz. Other power supplies, such as that available in mines or subways, may be dc. Additionally, power may be provided from generators that attempt to provide power at such voltages and frequencies, or at other voltages and frequencies, or at dc.

Welding power sources receive such inputs and produce an approximately 10–40 volt dc high current welding output. Substantial power is delivered to a welding arc which generates heat sufficient to melt metal and to create a weld. Cutting power sources receive such inputs and produce an approximately 80 volt dc high current cutting output. Induction heating power sources receive such inputs and produce an approximately 200 volt ac high current heating output. Because welding, heating and cutting require similar high power outputs, welding type power source or supply, as used herein, includes welding, plasma and induction heating power sources and supplies. Welding type power, as used herein, refers to welding, plasma or heating power.

Given the various utility and generator power inputs it is desirable for a welding/plasma/heating power supply to be able to receive any of a wide range of power inputs. Several hurdles must be overcome to allow a power supply to receive multiple input voltages. First, the power circuit must be able to receive the expected voltage magnitudes and frequencies, yet still provide the desired output voltage. Second, the desired control voltage must be provided, regardless of the input voltage. Also, when aux power (for tools etc.) is being provided, the desired output voltage and frequency (110V ac at 60 Hz, e.g.) must be provided regardless of the input voltage and frequency.

Early power supplies overcame these hurdles by having taps on transformers correspond to each expected voltage. The taps were selected by the user manually "relinking" the power supply for each input voltage. This was time consuming, and required the user open the power supply. Operating an improperly linked power source could result in personal injury, power source failure or insufficient power.

A prior art welding source that improved upon manual linking provided an automatic linkage. For example, the Miller Electric AutoLink®, described in U.S. Pat. No. 5,319,533, incorporated herein by reference, tested the input voltage when they are first turned on, and automatically set the proper linkage for the input voltage sensed. The power supply included two inverters connected in parallel (for 230V, for example) or in series (e.g., for 460V). Such arrangements generally allow for two voltage connection possibilities. However, the higher voltage must be twice the lower voltage. Thus, such a power source cannot be connected to supplies ranging from 230V–460V to 380V–415V or 575V.

Another prior art power supply that was a significant advance in the ability of a power source to receive a wide range of power is described in U.S. Pat. No. 5,601,741, issued Feb. 11, 1997, on application Ser. No. 08/342,378, filed Nov. 18, 1994, entitled Method And Apparatus For Receiving A Universal Input Voltage In A Welding Power Source, and is owned by the assignee of the present invention. The power supply described in U.S. Pat. No. 5,601,741 is implemented commercially in the Miller Omniline® power supply.

The welding/plasma/heating power supply of U.S. Pat. No. 5,601,741 (incorporated herein by reference), includes an input stage, a preregulator stage, and an output stage. Also, a controller (with a power source) controls the power supply to produce a desired output. The power supply for the controller is referred to as an auxiliary power supply therein. However, the present invention also includes a power output for tools etc that is often referred to as an auxiliary power output. Thus, to avoid confusion, the power output for tools will be referred to herein as aux power, and the power for the controller will be referred to herein as control power.

Generally, the Omniline® input stage receives ac utility or generator power, and rectifies that power to provide a first dc signal. The rectified dc signal is provided to the preregulator, which includes a boost converter. The boost converter boosts the rectified signal to create a dc bus. The output stage includes an inverter, transformer, and rectifier which create welding, cutting, or heating power (welding type power) from the bus.

Because a dc bus is created (by the boost converter) and then inverted to create the output power, the output power voltage and frequency is independent of the input voltage and frequency. This allows a wide range of input voltages and input frequencies to be used.

However, power for the controller is derived by transforming the input voltage. The control power circuit determines the magnitude of the incoming power, and configures taps on a transformer to obtain the desired control power. The control power transformer is relatively small since the amount of control power needed is relatively small. While a wide range of input power are thus acceptable, the input must be sufficient that, for a selected tap, the control voltage is acceptable.

Thus, the Omniline® provided the desired output voltage by inverting a dc bus having a magnitude independent of the input voltage. Also, the Omniline® created control power by selecting taps on a transformer. This allowed a wide range of input voltages to be used, but still required the input voltage to have an appropriate magnitude for being transformed into a control voltage. Additionally, this prior art did not provide an aux power (for tools), that had a voltage and frequency independent of the input voltage and frequency.

Accordingly, a welding power source that may receive any common input voltages or frequency is desirable. Preferably, this is accomplished without the need of any linkages for the welding power input and for the control power input. Additionally, it is desirable to have such a welding power source that produces aux power and weld power having a frequency and voltage independent of the input frequency and voltage.

SUMMARY OF THE INVENTION

According to a first aspect of the invention a welding type power source is capable of receiving a range of input voltages and frequencies. It includes an input circuit, a preregulator, an output circuit, a preregulator controller, and a control power circuit. The input circuit receives input power at an input frequency and an input magnitude, and provides a signal having a magnitude responsive to the input magnitude to the preregulator. The preregulator provides a dc signal having a preregulator magnitude independent of the input magnitude to the output circuit. The output circuit provides a welding type output power signal having an output frequency independent of the input frequency and having an output voltage independent of the input voltage. The preregulator controller is connected to the preregulator, and receives power from the control power circuit. The control power circuit derives power from the dc signal and provides control power to the controller that has a control power magnitude independent of the input magnitude and a control frequency independent of the input frequency.

The input circuit includes a rectifier in one embodiment.

The preregulator magnitude is greater than the first magnitude, and the preregulator includes a boost converter in various alternatives. The boost converter may include a slow voltage switched switch and a slow current switched switch.

The output circuit includes an inverter, which may include a switched snubber in other alternatives.

The preregulator magnitude is greater than the control power magnitude, and/or the control power circuit includes a buck converter in additional embodiments.

According to a second aspect of the invention a method of providing welding type power from a range of input voltages and frequencies, includes receiving an input power signal having an input frequency and an input magnitude. A first signal having a magnitude responsive to the input magnitude is provided. The first signal is converted into a dc second signal having a second magnitude independent of the input magnitude. A welding type power signal derived from the dc second signal has an output frequency independent of the input frequency and further has an output voltage independent of the input voltage. The dc second signal is converted into control power having a control power magnitude independent of the input magnitude.

The input signal is rectified in one embodiment.

The second magnitude is greater than the first magnitude, and converting the first signal into a dc second signal includes boost converting the first signal in other embodiments. Boost converting may include slow voltage switching and slow current switching a switch.

The output power signal is provided by inverting the dc second signal, and/or using a switched snubber in various alternatives.

The second magnitude is greater than the control power magnitude, and/or converting the dc second signal into control power includes buck converting the dc second signal in additional alternative.

According to a third aspect of the invention a welding type power source capable of receiving a range of input voltages and frequencies includes a dc bus. An output circuit receives the dc bus, and provides a welding type output power signal. The output power is voltage and frequency independent of the input power. A controller is connected to the output circuit. Power for the controller comes from the dc bus, through a control power circuit.

According to a fourth aspect of the invention a method of providing welding type power from a range of input voltages and frequencies includes receiving a dc bus and providing welding type power at a magnitude independent of the bus magnitude, but derived from the dc bus. The dc bus is also converted into control power whose magnitude is independent of the dc bus magnitude.

According to a fifth aspect of the invention a method of starting to provide providing welding type power from a range of input voltages and frequencies, includes receiving an input power signal and providing a first dc signal at magnitude responsive to the input's magnitude. A second dc voltage whose magnitude is less than the first dc magnitude is derived from the first dc magnitude. A control converter is controlled with the second dc voltage such that the control converter produces a control dc voltage. An output converter is controlled with the control dc voltage to produce an output signal.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular power supply, having particular components, and used in a particular environment, it should be understood at the outset that the invention may also be implemented with other power supplies, components, and used in other environments.

Figure 1:
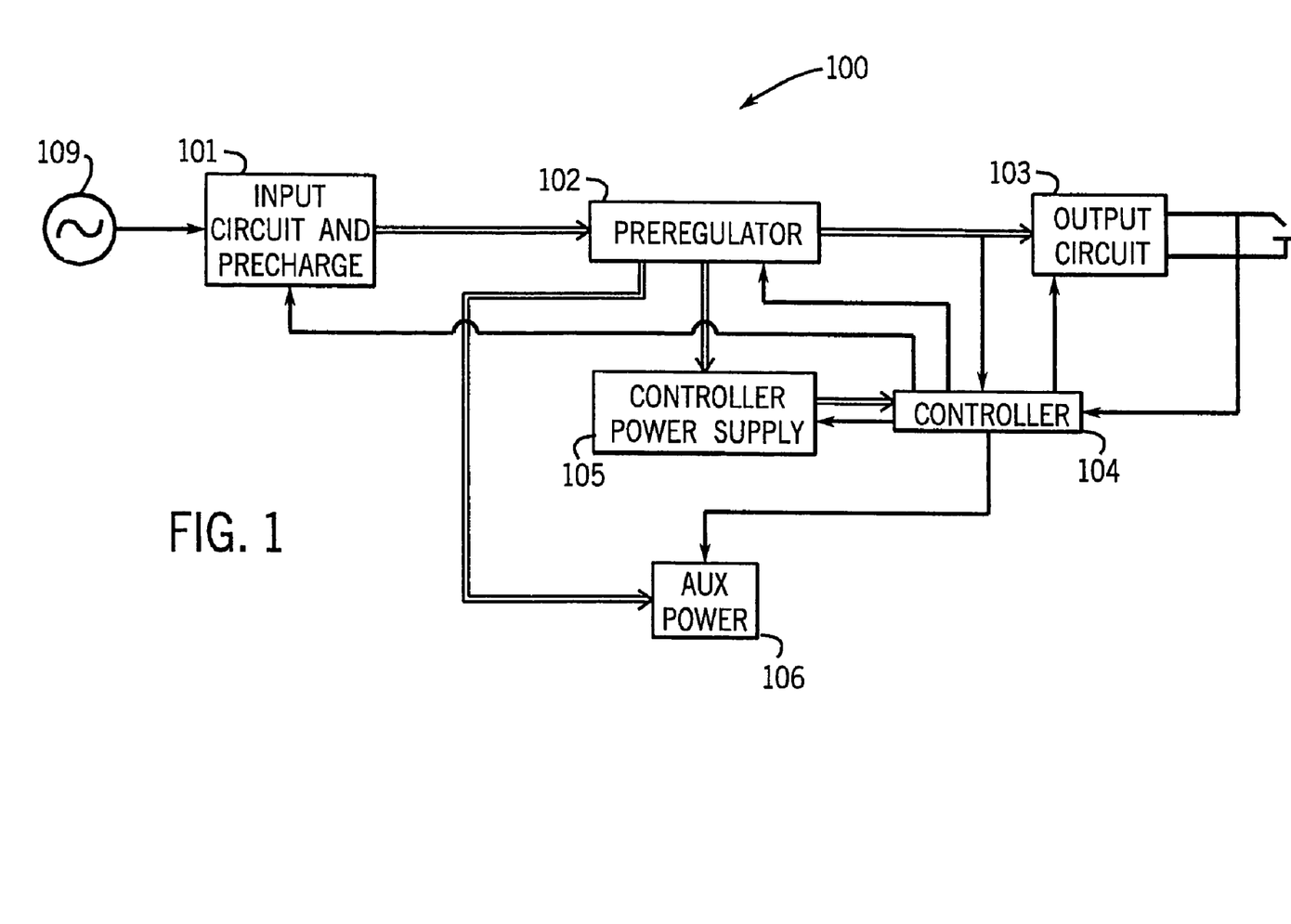
FIG. 1 is a block diagram of a welding power supply constructed in accordance with the present invention.

Referring now to FIG. 1, a welding power source 100 includes an input circuit 101, a preregulator 102, an output circuit 103, a controller 104, a controller power supply 105, and an aux power supply 106.

Input circuit 101 receives input utility or generator power, and provides a signal to preregulator 102. The input is ac, and the input circuit includes a rectifier and capacitor bank in the preferred embodiment. Thus, the output of the input circuit is a dc (uni-polar) signal, having a frequency twice that of the input frequency. Input circuit 101 is comprised of other components in alternative embodiments.

Preregulator 102 receives the signal from input circuit 101 and provides preregulated signal. Preregulator 102 includes a boost converter and boosts the rectified signal to be a dc bus (about 800Vdc) in the preferred embodiment. Preregulator 102 is controlled so that, regardless of the input, the dc bus voltage is about 800 V. Thus, the magnitude of the dc bus voltage is independent of input magnitude. (As used herein a second voltage is independent of first voltage when magnitude of the second voltage is controlled to be a value which is not proportional to or a function of the first voltage). Also, the dc bus frequency (substantially zero, but with ripple) is independent of the input frequency. (As used herein a second voltage is independent of first voltage when magnitude of the second voltage is controlled to be a value which is not proportional to or a function of the first voltage).

Preregulator 102 includes other types of converters, such as an inverter, a series resonant converter, etc., in other embodiments. Converter, as used herein, includes a power circuit that receives or provides an ac or dc signal, and converts it to the other of an ac or dc signal, or to a different frequency. Inverter, as used herein, includes a power circuit that receives or provides a dc bus signal that is inverted to be an ac signal.

If a dc input signal is received, input circuit 101 simply passes the dc signal to preregulator 102, or is omitted altogether. If the dc input signal is of a sufficient magnitude, preregulator 102 may pass simply provide the dc input as the dc bus, or be omitted altogether.

Output circuit 103 receives the dc bus and provides an output suitable for welding/heating/cutting. Output circuit 103 includes, in the preferred embodiment, an inverter, followed by a transformer, followed by a rectifier and an output inductor. The output power is also frequency and voltage independent of the dc bus and the input signal. Output circuit 103 is comprised of other components in other embodiments, and may provide an ac or dc output.

Controller 104 includes control circuitry similar to that known in the prior art, and causes the boost and inverter switches to switch in response to feedback and a setpoint (such as 800V for the boost converter and a user setpoint for the output inverter).

Control power is provided to the controller by controller power supply 105. Controller power supply 105 derives power from the output of preregulator 102, in the preferred embodiment. Controller power supply 105 includes a buck converter that steps down the 800V to 15V dc. The magnitude and frequency of the output of controller power supply is thus independent of the dc bus, and the input power. It is easily seen that, once the 800V dc bus is present control power is easily derived from the bus rather than from a control power transformer, any input voltage and frequency is acceptable. Thus, linking, such as adjusting transformer taps, need not be performed.

The circuitry that controls preregulator 102, output circuit 103 and controller power supply 105 is collectively called controller 104 because of the common function (controlling). However, in practice they may form distinct and remotely located circuits, they may share circuitry, they may reside in a common microprocessor or DSP, and they may share control signals and feedback.

One potential difficulty at start up is a result of the switching of the buck converter in controller power supply 105 being controlled by controller 104: The 800V dc bus is not created until the controller causes the boost converter switch to switch on and off, but the controller cannot control the switch until it has power, and the power for the controller is derived from the dc bus.

This difficulty is overcome in the preferred embodiment because even before the boost converter begins to switch to create the 800V dc bus, the dc bus will have the same magnitude as the rectified input voltage, which is typically at least 110V rms. Since the buck converter steps down the bus voltage to 15V dc, even a relatively low magnitude input voltage (110V ac e.g.) is sufficient to create the controller power. Also, control power for the buck converter is derived from a floating 15 volt supply, by bleeding current from the bus.

The start up sequence will be described in detail below, but generally is as follows. At start up the dc bus quickly rises to the rectified input voltage, through a precharge resistor. The precharge resistor is bypassed after the bus is charged. Current bled from the bus charges capacitors which provide power for the buck converter controller. The buck converter controller controls the buck converter, causing it to produce 15V dc power for all of controller 104. Controller 104 controls the boost converter in preregulator 102 to step up the rectified input and produce an 800V dc bus. Thus, the 800V dc bus is created, and can provide power to output circuit 103 when the user begins to weld.

Additionally, aux power supply 106 includes an inverter, and produces a synthetic aux power, i.e., a desired output voltage at a desired output frequency (110V ac at 60 Hz, e.g.). Controller 104 also controls aux power supply 106.

Input circuit 101, preregulator 102, output circuit 103, and the portions of controller 104 that control them, are implemented using the circuitry shown in U.S. Pat. No. 5,601,741 (and correspond to like numbered features of the drawings therein) in one embodiment. However, a wide variety of circuits may be used to implement this part of the present invention, and the details of will not be described in detail herein.

A particular switching circuit is used for the preregulator in another embodiment because it provides for efficient slow voltage switching and slow current switching. This circuit is described in patent application Ser. No. 09/111,950, filed, Jul. 9, 1998, entitled Power Converter With Low Loss Switching, and owned by the owner of this invention. Slow voltage/current transitions or switching (SVT and SCT) as used herein, describe transitions where the voltage or current rise is slowed (rather than held to zero), while the switch turns off or on.

Figure 2:
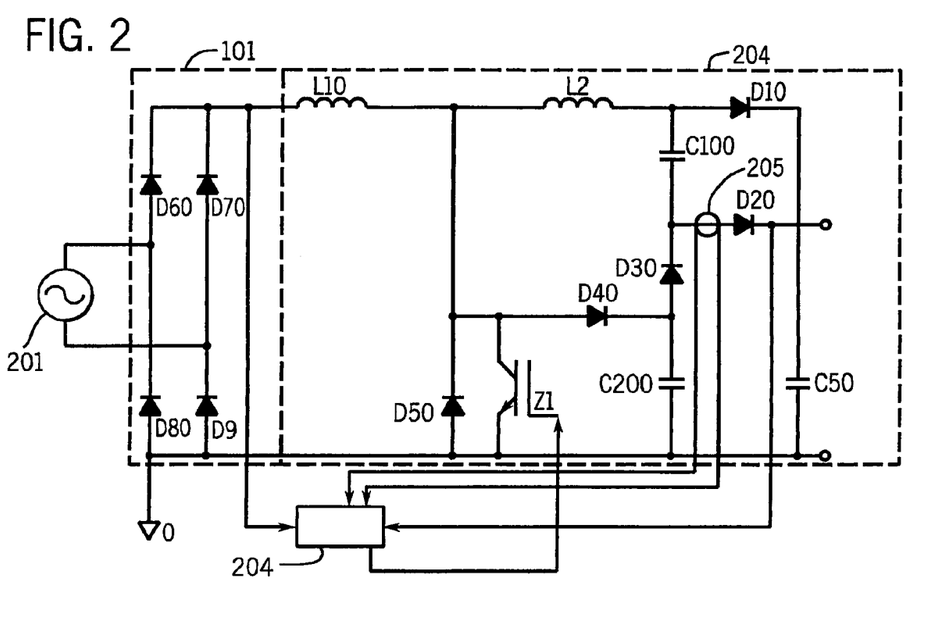
FIG. 2 is a circuit diagram of one embodiment of the preregulator of FIG. 1.

The circuit used in the preferred embodiment to implement preregulator 102 is shown in FIG. 2 (along with input circuit 101 and voltage source 109). The embodiment of FIG. 2 uses a 90–250 volt ac power line as input voltage 109. Input circuit 101 is comprised of diodes D60, D70, D80, and D9, which rectify the input voltage to provide a single polarity sinusoidal input voltage.

A power factor correction portion (described below) of preregulator 102 functions best when the input voltage is sinusoidal, although it could be another alternating input. Thus, a small (10 µF) capacitor (not shown) is provided across the input rectifier in one embodiment to smooth the input line voltage.

The rectified input voltage is applied to a boost inductor L10 (750 µH) which is connected with a boost switch Z1 (preferably an IGBT) to form a boost convertor. An anti-parallel diode D50 is connected across switch Z1 to protect switch Z1 during transitions. The portion of the circuit which provides the lossless switching includes a snubber inductor L2 (3.9 µH) a pair of capacitors C100 (1 µF) and C200 (0.068 µF), and diodes D10, D20, D30, and D40. Switch Z1 is switched in a known manner such that the output of preregulator 102 is a desired voltage, no matter what the input voltage is. The output is provided across a capacitor C50 (2000 µF) that provides a stable voltage source (200 volts in the preferred embodiment) for the downstream convertor. Also, capacitor C50 prevents the voltage from being dangerously high and damaging switch Z1.

The portion of preregulator 102 that provides power factor correction is a power factor correction circuit 204 (FIG. 2), and generally senses the input voltage waveform, and conforms the shape of the current waveform to be that of the line voltage waveform. This provides a power factor of very close to 1, 0.99 in the preferred embodiment. Power factor correction circuit 204 may be implemented using an integrated circuit, such as a UC3854 or an ML4831, or with discrete components, such as those shown in the above-referenced Power Converter With Low Loss Switching, incorporated herein by reference.

Power factor correction circuit 204 receives as inputs the output voltage from input circuit 101, the output voltage from preregulator 102, and the output current of preregulator 102 (using a CT). Because the frequency of preregulator 102 (25 Khz) is much higher than that of the line (60 Hz) the pre-regulator current can be made to track the input line voltage shape by sensing the shape of the input voltage, and controlling the input current in response thereto.

Output circuit 103 can include a conventional inverter, output transformer, output rectifiers, and an output inductor such as in U.S. Pat. No. 5,601,741. However, in one embodiment, the inverter is a switched snubber, such as that described in Power Converter With Low Loss Switching, and shown in FIG. 3.

Figure 3:
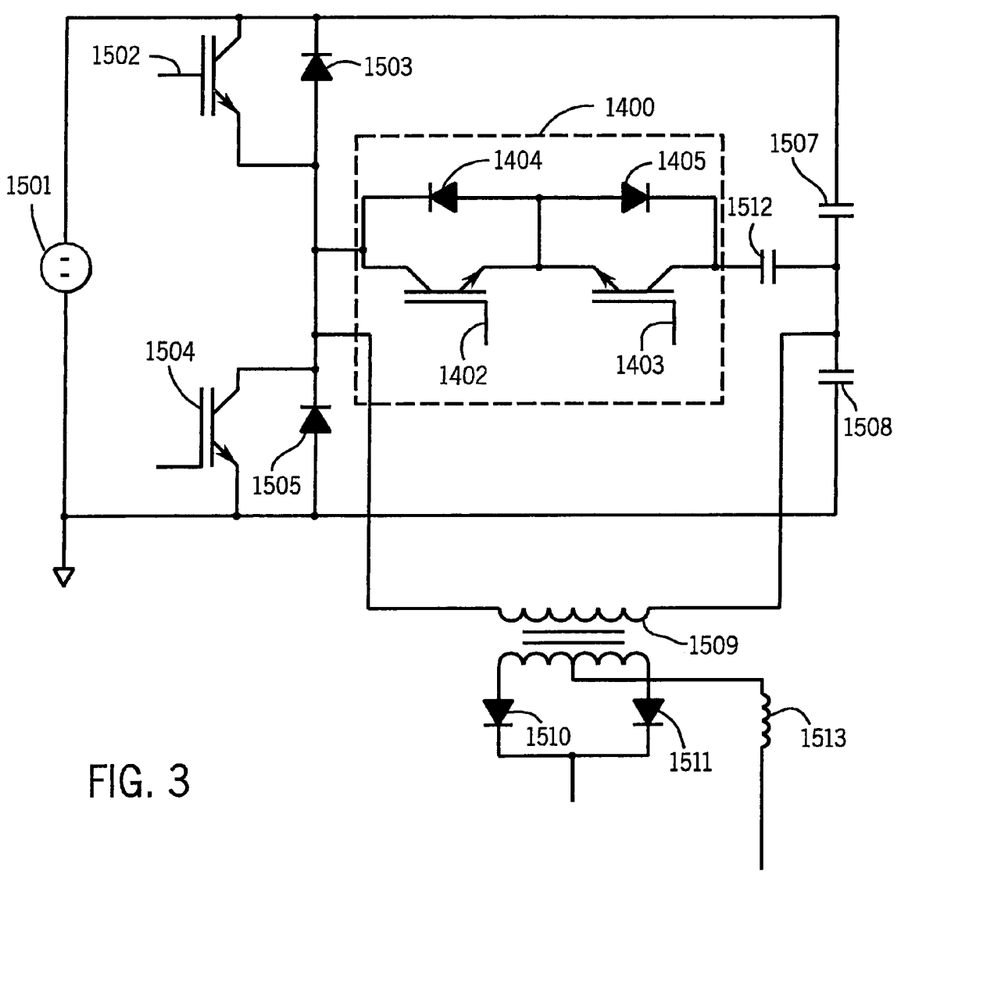
FIG. 3 is a circuit diagram of one embodiment of an inverter with a switched snubber used in the output circuit of FIG. 1.

The invertor implemented with a switched snubber includes a dc voltage source 1501, a pair of switches 1502 and 1504, with a pair of anti-parallel diodes 1503 and 1505, a pair of capacitors 1507 and 1508 (1410 µF), a transformer 1509, a capacitor 1512 (0.099 µF), an output rectifier including diodes 1510 and 1511, and an output inductor 1513.

Capacitor 1512 is switched across transformer 1509 by switches 1502 and 1504. Switches 1402 and 1403 are used to soft switch switches 1502 and 1504. Switches 1402 and 1403 do not need any special timing, and run with the main clock at effectively 50% duty cycle. For example, switches 1502 and 1402 turn on together, and switch 1502 delivers current to transformer 1509, while switch 1402 does nothing. When switch 1502 turns off, switch 1402 remains on, and current is directed through switch 1402 and diode 1405 into capacitor 1512, thus giving an SVT (Slow Voltage Transition) turn off. Switch 1402 is turned off after the transition and diode 1405 prevents the back flow of current from capacitor 1512. This occurs in complimentary fashion with switches 1502 and 1402 and diode 1405. Thus, this circuit provides full-wave transformer usage, PWM control, complete capacitor balance control with no extra circuitry, and efficient use of switches with SVT. An alternative embodiment includes using a full bridge version of the snubber.

The specific circuitry used to control the switched snubber may be conventional control circuitry, such as that described in Power Converter With Low Loss Switching.

Figure 4:
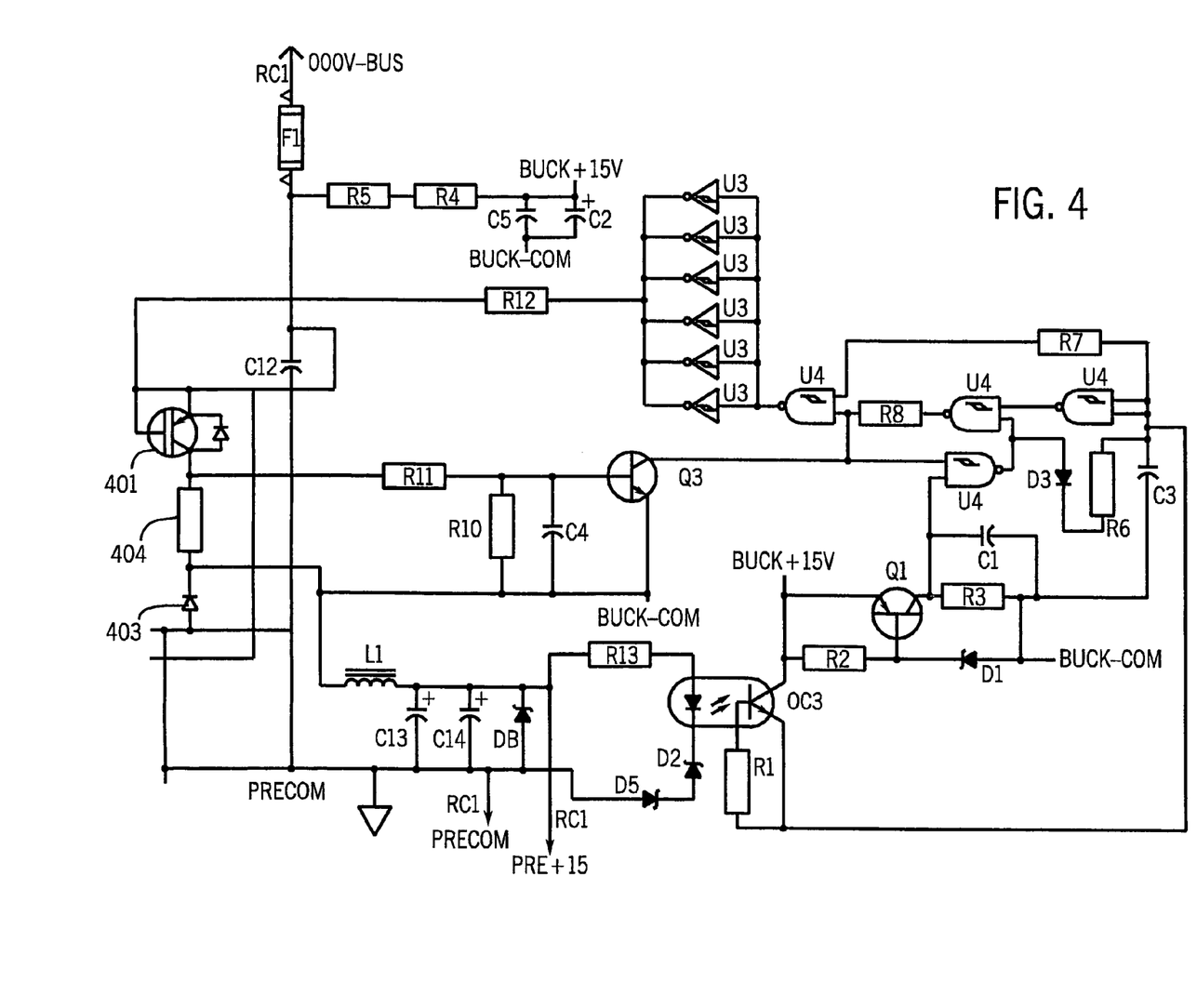
FIG. 4 is a circuit diagram of one embodiment of the controller power circuit and portions of the controller of FIG. 1.

A circuit used to implement controller power supply 105, and a portion of controller 104 that controls controller power supply 105 is shown. Controller power supply 105 includes a buck converter in the preferred embodiment, and includes a switch 401, a freewheeling diode 403 and a buck inductor L1, configured in a conventional buck arrangement, and a resistor 404 (0.5 ohms).

The circuitry that controls the buck converter (or regulator), in the preferred embodiment, is also shown on FIG. 4, and is part of controller 104. One skilled in the art will readily recognize that the control circuitry may be located on the same controlboard as the portion of controller 104 that controls preregulator 102 and output circuit 103, or it may be located remotely therefrom, for example on the PC board for controller power supply 105.

Generally, the buck converter is controlled such that at startup current is bled from the DC bus to charge a capacitor, thus providing sufficient power to turn on and off the buck switch. The voltage across the capacitor is a floating voltage, and is sufficient to operate the buck converter control circuitry. The control circuitry causes the buck switch to turn on and off repeatedly to create a control power of about 15 volts DC. The 15 volts DC is then used to power the remaining control circuitry.

More specifically, when the power supply is turned on the DC bus will have a voltage equal to the peak voltage of the input rectified signal (about 200 volts DC for an input having 140 volts RMS, e.g.). Current bleeds from the bus through a pair of resistors R5 (150 Kohms) and R4 (150 Kohms) to charge a pair of capacitors C5 (0.1 µF) and C2 (100 µF). The voltage across capacitors C2 and C5 is called the BUCK-COM and BUCK+15V, and is the floating voltage supply for the circuitry that controls the buck converter Proper selection of the resistance of resistors R5 and R4 (and other components described below) determines the minimum voltage needed on the dc bus to operate the buck converter control circuitry. In the preferred embodiment the minimum voltage is no higher than that obtained by rectifying 110V ac power.

When the voltage across capacitors C5 and C2 reaches approximately 11.7 volts a switch Q1 turns on. Switch Q1 is used to enable (or disable) the logic or control circuitry for the buck converter. When the voltage across capacitors C2 and C5 is less than about 11.7 volts, then switch Q1 off, and the logic circuitry is disabled. A resistor R2 (10 Kohms), a resistor R3 (100 ohms) and a zener diode D1 (11 volts) are associated with switch Q1, and create the turn on voltage. Thus, the resistance of resistor R3 also sets the minimum voltage needed to operate the circuitry that controls the buck controller.

The logic circuitry includes a plurality of NAND gates U4A, U4B, U4C, AND U4D, and associated circuitry capacitors C1 (0.1 µF) and C3 (0.001 µF), resistors R6 (20 Kohms), R7 (332 Kohms) and R8 (20 Kohms). This circuitry controls a plurality of paralleled NOT gates U3, whose output is the on/off signal to the base of buck switch

401, through a resistor R12 (10 ohms). The supply voltage for the logic circuitry is the floating BUCK-COM/BUCK+ 15V voltage supply.

When NOT gates U3 output is 1, buck switch 401 is on, and when NOT gates U3 output is 0, buck switch 401 is off. NOT gates U3 output is 1 when their input is 0, which requires both inputs of NAND gate U4D to be 1.

At start up, before the bus charges the BUCK-COM/BUCK−15V voltage supply to 11.7 volts switch Q1 is off. Thus, an input to NAND gate U4A is 0, and the output of NAND gate U4A is 1. This output is fed through diode D3 and resistors R6 and R7 to the inputs pin 2 of NAND gate U4B, and the output of NAND gate U4B is thus 0. The output of NAND gate U4B is fed to input pin 2 of NAND gate U4A, thus holding the output of NAND gate U4D high (and holding switch 401 off). Also, at start up the output of NAND gate U4C is 1 because both its inputs from NAND gate U4B is 0.

When the bus charges the BUCK−COM/BUCK+15V voltage supply to 11.7 volts switch Q1 is turned on, and input pin 9 of NAND gate U4A goes high, thus enabling the output of NAND gate U4A to go low, and enabling the output of NAND gate U4B to go high and the output of NAND gate U4D to turn on switch 401 (through gates U3). Also, when the output of NAND gate U4A goes to 0, capacitor C3 discharges through resistor R7 (with a relatively long RC time constant). When capacitor C3 has discharged, the output of NAND gate U4B goes to 1 causing the output of NAND gate U4D to go 0, turning on buck switch 401.

The associated circuitry causes the logic to latch until input pin 8 of NAND gate U4A goes to zero. This happens because when switch 401 is on current through inductor L1 increases, turning on a switch Q3 through a pair of resistors R11 (2 Kohms) and R10 (100 Kohms) and a capacitor C4 (0.001 µF). When switch Q3 is turned on, input pin 8 of NAND gate U4A is 0 and the output of NAND gate U4D is 1, causing (eventually) the output of NAND gate U4B to be 0, the output of NAND gate U4C to be 1, and the output of NAND gate U4D to be 1, turning off switch 401.

The process of turning switch 401 on and off is repeated, and limited after the necessary 15V dc bus is created on a pair of outputs PRECOM and PRE+15V. The current through inductor L1 charges a pair of capacitors C13 and C14 (2200 µF). Outputs PRECOM and PRE+15V are connected across capacitors C14 and C14, thus, when they have charged to +15V, the needed control power is provided. A zener diode D8 prevents the magnitude of the voltage across outputs PRECOM and PRE+15V from getting to high.

A resistor R13 (1 Kohm), a pair of zener diodes D5 and D2 (6.8V), an opto-isolator OC3, and a resistor R1 (1 Mohm) limit the turning on of buck switch 401 when the voltage across outputs PRECOM and PRE+15V reaches 15 volts. When the voltage drop across diodes D5 and D6 and opto OC3 reaches 15 volts, opto OC3 turns on, pulling up the inputs to NAND gate U4B, turning off switch 401.

Figure 5:
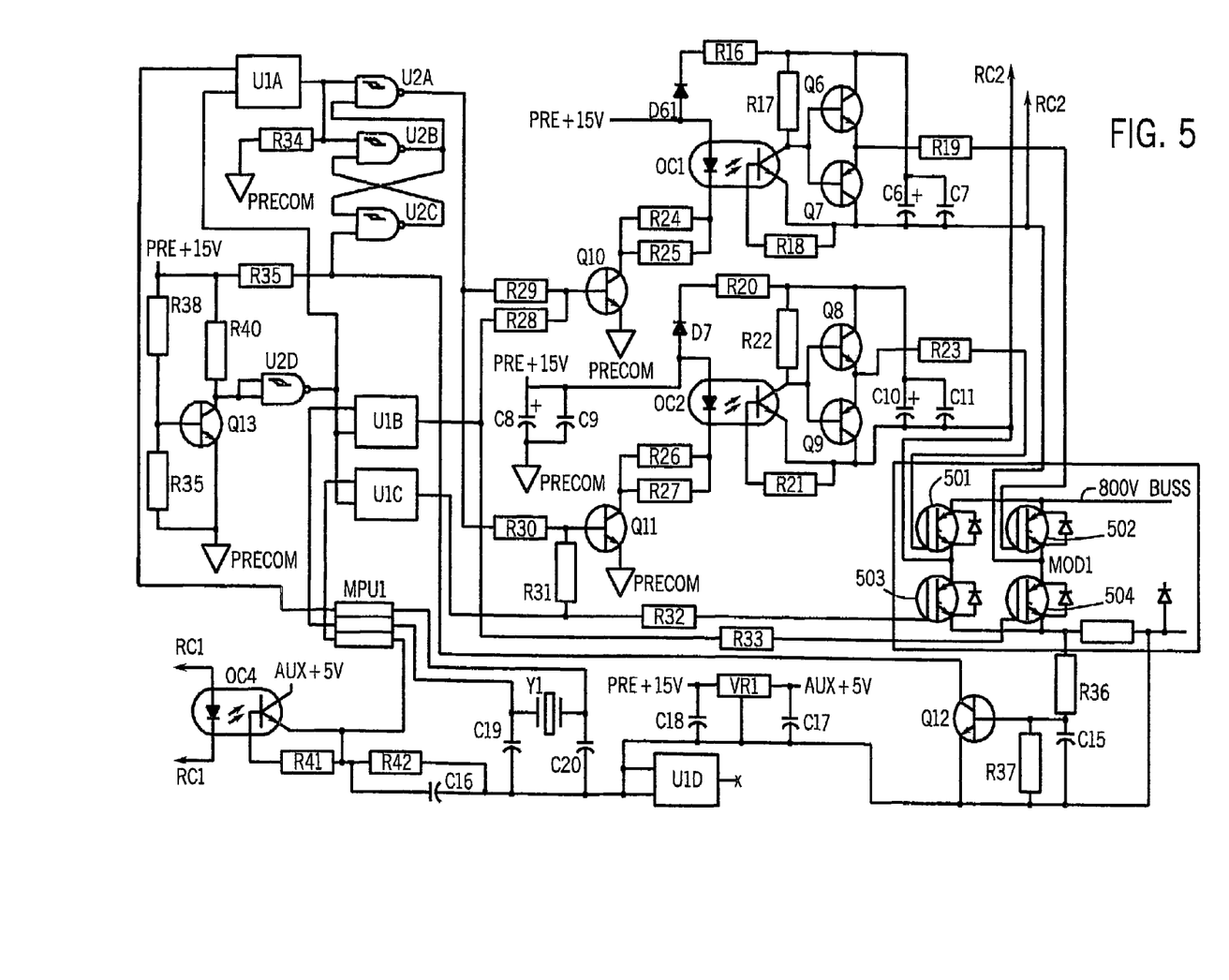
FIG. 5 is a circuit diagram of one embodiment of the aux power circuit and portions of the controller of FIG. 1.

A circuit used to implement aux power supply 106, and a portion of controller 104 that controls aux power supply 106 is shown in FIG. 5. One skilled in the art will readily recognize that the control circuitry may be located on the same control board as the portion of controller 104 that controls preregulator 102 and output circuit 103, or it may be located remotely therefrom, for example on the PC board for aux power supply 106.

Aux power supply 106 includes an inverter in the preferred embodiment, and operates much like a motor drive, or typical AC inverter circuit (the output follows a pattern of high, zero and negative, zero, high, zero, . . . ). The output is, in the preferred embodiment, a synthetic AC, 60 Hz, 575V supply (dependent on magnitude of the 800V bus). The 575 Volt supply may be transformed to any desired magnitude. Alternatively, the magnitude may be controlled to a lower value by having a different bus value, or by bucking the bus value down to a desired level. The regulated level could be preset or user selected. Also, the frequency can be user selected (50 or 60 Hz e.g.) or preset.

The inverter includes 4 switches 501–505, which are turned on and off to produce ac power on a pair of outputs AC/2 and AC/1. Specifically, normally switches Q3 and Q4 are on and freewheeling (when there is no applied voltage difference across outputs AC/1 and AC/2). AC/1 is made high (and AC/2 low) by turning switch 502 on and switch 504 off. Thus, the conduction path is from the bus, through switch 502, to AC/1 and the load, and then from AC/2 through switch 503 to ground (PRECOM). Conversely, AC/1 is made low (and AC/2 high) by turning switch 501 on and switch 503 off. Thus, the conduction path is from the bus, through switch 501, to AC/2 and the load, and then from AC/3 through switch 504 to ground (PRECOM).

The remaining circuitry on FIG. 5 is control circuitry, and is powered by PRECOM and PRE+15V. The circuitry operates in a conventional manner and includes drive circuitry, level shifters, current limiters and an enable circuit.

The gate drives for the switches operate in a conventional fashion, and include resistors R16 (10 ohms), R17 (5.11 Kohms), R18 (1 Mohms), R19 (22.1 ohms), R20 (10 ohms), R21 (1 Mohms), R22 5.11 Kohms), R23 (22.1 ohms), R24 (2 Kohms), R25 (2 Kohms), R26 (2 Kohms), R27 (2 Kohms), R28 (20 Kohms), R29 (20 Kohms), R30 (20 Kohms), and R31 (20 Kohms), capacitors C6 (100 µF), C7 (0.1 µF), C10 (100 µF), C11 (0.1 µF), switches Q6, Q7, Q8, Q9, Q10 and Q11, diodes D61 and D7, and opto-isolators OC1 and OC2.

Latch circuitry current limits each cycle, and operates in a conventional fashion. The latch circuitry includes level shifter U1A (40109), gates U2A, U2B, U2C, U2D, resistors R32 (22.1 Kohms), R33 (22.1 Kohms), R34 (20 Kohms), R35 (20 Kohms), R36 (3.01 Kohms), R37 (5.11 Kohms), R38 (16 Kohms), R39 (1 Kohms) and R40 (20 Kohms), a capacitor C15 (0.000 µF) and a pair of switches Q12 and Q13. A pair of level shifters U1B and U1C (40109) are also provided.

An enable circuit includes opto-isolator OC4, resistors R41 (1 Mohms) and R42 (20 Kohms), and capacitor C16 (0.1 µF). A voltage regulator circuit includes voltage regulator VR1, capacitor C18 (0.1 µF), capacitor C17 (0.1 µF) and regulator VR1, and produces a regulated +5V supply form the +15V supply generated by the buck regulator.

A timing circuit sets the clock for the control circuitry and aux frequency. The timing circuitry includes a microprocessor MPU1, capacitor C19 (22 pF) and capacitor C20 (22 Pf), a crystal oscillator Y1 (4.096 MHz), and a level shifter U1D.

These components cooperate in a known manner to produce the desired 575V ac, 60 Hz output. As stated above, the circuit could be modified to allow the user to select the voltage magnitude and/or frequency.

Numerous modifications may be made to the present invention which still fall within the intended scope hereof. Thus, it should be apparent that there has been provided in accordance with the present invention a method and apparatus for providing welding type power from any typical input voltage or frequency that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A welding type power source capable of receiving a plurality of input voltages and frequencies, comprising:
   an input circuit configured to receive an input power signal having an input frequency and an input magnitude
   a preregulator configured to receive the first signal and provide a dc second signal having a preregulator magnitude independent of the input magnitude;
   an output circuit configured to receive the dc second signal and provide a welding type output power signal having an output frequency independent of the input frequency and having an output voltage independent of the input voltage;
   a preregulator controller, connected to the preregulator, having a power factor correction circuit, and further having a controller power input; and
   a control power circuit configured to receive the dc second signal and provide a control power signal to the controller power input, wherein the controller power signal has a control power magnitude independent of the input magnitude and a control frequency independent of the input frequency.

2. The apparatus of claim 1, wherein the input circuit includes a rectifier.

3. The apparatus of claim 1, wherein the preregulator magnitude is greater than the first magnitude.

4. The apparatus of claim 3, wherein the preregulator includes a boost converter.

5. The apparatus of claim 4, wherein the boost converter includes a slow voltage switched switch and a slow current switched switch.

6. The apparatus of claim 3, wherein the output circuit includes an inverter.

7. The apparatus of claim 3 wherein the output circuit includes a switched snubber.

8. The apparatus of claim 3, wherein the preregulator magnitude is greater than the control power magnitude.

9. The apparatus of claim 3 wherein the control power circuit includes a buck converter.

10. A method of providing welding type power from a plurality of input voltages and frequencies, comprising:
    receiving an input power signal having an input frequency and an input magnitude;
    converting and power factor correcting, by controlling a switch, the input signal into a dc second signal having a second magnitude independent of the input magnitude;
    providing an output power signal derived from the dc second signal, wherein the output power signal is a welding type output and has an output frequency independent of the input frequency and further has an output voltage independent of the input voltage; and
    converting the dc second signal into control power, wherein the control power has a control power magnitude independent of the input magnitude.

11. The method of claim 10, wherein providing a first signal includes rectifying an ac signal.

12. The method of claim 10, wherein the second magnitude is greater than the first magnitude.

13. The method of claim 12, wherein converting the first signal into a dc second signal includes boost converting the first signal.

14. The method of claim 12, wherein boost converting the first signal includes a slow voltage switching and slow current switching a switch.

15. The method of claim 12, wherein providing an output power signal includes inverting the dc second signal.

16. The method of claim 12 wherein inverting the dc second signal includes switching a snubber.

17. The method of claim 12, wherein the second magnitude is greater than the control power magnitude.

18. The method of claim 12 wherein converting the dc second signal into control power includes buck converting the dc second signal.

19. A welding type power source capable of receiving a plurality of input voltages and frequencies, comprising:
    input means for receiving an input power signal having an input frequency and an input magnitude and for providing a first signal
    converting means for converting, and power factor correcting by controlling a switch, the first signal into a dc second signal having a magnitude independent of the input magnitude, wherein the converting means is connected to receive the first signal;
    means for providing a welding type output power signal derived from the dc second signal, wherein the output power signal and has an output frequency independent of the input frequency and further has an output voltage independent of the input voltage, and wherein the means for providing an output power signal is disposed to receive the dc second signal;
    means for converting the dc second signal into control power, wherein the control power has a control power magnitude independent of the input magnitude.

20. The apparatus of claim 19, wherein the first means includes means for rectifying an ac signal.

21. The apparatus of claim 20, wherein the convertor magnitude is greater than the first magnitude.

22. The apparatus of claim 21, wherein the converting means includes means for boost converting the first signal.

23. The apparatus of claim 22, wherein the means for boost converting includes means for slow voltage switching and slow current switching a switch.

24. The apparatus of claim 23, wherein the means for providing an output power signal includes means for inverting the dc second signal.

25. The apparatus of claim 24 wherein the means for inverting includes means for switching a snubber.

26. The apparatus of claim 25, wherein the converter magnitude is greater than the control power magnitude.

27. The apparatus of claim 26 wherein the means for converting the dc second signal into control power includes means for buck converting the dc second signal.

28. A welding type power source capable of receiving a plurality of input voltages and frequencies, comprising:
    a dc bus;
    an output circuit configured, having a control input and to receive the dc bus and provide a welding type output power signal having an output frequency independent of the input frequency and having an output voltage independent of the input voltage;
    a controller, including a power factor correction circuit, connected to the control input and further having a controller power input; and a control power circuit configured to receive the dc bus and provide a control power signal to the controller power input.

29. The apparatus of claim 28, wherein the output circuit includes an inverter.

30. The apparatus of claim 29, wherein the output circuit includes a switched snubber.

31. The apparatus of claim 28, wherein the dc bus has a magnitude is greater than a magnitude of the control power signal.

32. The apparatus of claim 28 wherein the control power circuit includes a buck converter.

33. A welding type power source capable of receiving a plurality of input voltages and frequencies, comprising:
an input circuit configured to receive an input power signal having an input frequency and an input magnitude;
a preregulator configured to receive the input signal and provide a dc second signal having a preregulator magnitude independent of the input magnitude;
an output circuit configured to receive the dc second signal and provide a welding type output power signal having an output frequency independent of the input frequency and having an output voltage independent of the input voltage;
a preregulator controller, connected to the preregulator, and further having a controller power input; and
a control power circuit configured to receive the dc second signal and provide a control power signal to the controller power input, wherein the controller power signal has a control power magnitude independent of the input magnitude and a control frequency independent of the input frequency, without reconfiguring the control power circuit.

34. The apparatus of claim 33, wherein the input circuit includes a rectifier.

35. The apparatus of claim 33, wherein the preregulator magnitude is greater than the first magnitude.

36. The apparatus of claim 35, wherein the preregulator includes a boost converter.

37. The apparatus of claim 36, wherein the boost converter includes a slow voltage switched switch and a slow current switched switch.

38. The apparatus of claim 35, wherein the output circuit includes an inverter.

39. The apparatus of claim 35 wherein the output circuit includes a switched snubber.

40. The apparatus of claim 35, wherein the preregulator magnitude is greater than the control power magnitude.

41. The apparatus of claim 35 wherein the control power circuit includes a buck converter.

42. A method of providing welding type power from a plurality of input voltages and frequencies, comprising:
receiving an input power signal having an input frequency and an input magnitude;
providing a first signal having a magnitude responsive to the input magnitude;
converting the first signal into a dc second signal having a second magnitude independent of the input magnitude;
providing an output power signal derived from the dc second signal, wherein the output power signal is a welding type output and has an output frequency independent of the input frequency and further has an output voltage independent of the input voltage; and
converting the dc second signal into control power, without reconfiguring a control power circuit, wherein the control power has a control power magnitude independent of the input magnitude.

43. The method of claim 42, wherein providing a first signal includes rectifying an ac signal.

44. The method of claim 42, wherein the second magnitude is greater than the first magnitude.

45. The method of claim 44, wherein converting the first signal into a dc second signal includes boost converting the first signal.

* * * * *